United States Patent
Gorres et al.

(10) Patent No.: US 7,314,168 B1
(45) Date of Patent: Jan. 1, 2008

(54) ACCOUNT MONITORING SYSTEM

(75) Inventors: Stefanie Gorres, Minneapolis, MN (US); Susan Lathrop, Chaska, MN (US); Jim Palecek, River Falls, WI (US)

(73) Assignee: Ameriprise Financial, Inc., Minneapolis, MN (US)

( * ) Notice: Subject to any disclaimer, the term of this patent is extended or adjusted under 35 U.S.C. 154(b) by 186 days.

(21) Appl. No.: 11/076,312

(22) Filed: Mar. 9, 2005

Related U.S. Application Data

(60) Provisional application No. 60/552,649, filed on Mar. 12, 2004.

(51) Int. Cl.
 *G06K 5/00* (2006.01)
 *G06Q 40/00* (2006.01)
(52) U.S. Cl. .................. 235/380; 705/35; 705/37
(58) Field of Classification Search ........... 235/380; 705/35, 37; 717/124, 24
 See application file for complete search history.

(56) References Cited

U.S. PATENT DOCUMENTS

| | | | |
|---|---|---|---|
| 2002/0091622 A1* | 7/2002 | Mastwyk et al. | 705/37 |
| 2004/0193532 A1* | 9/2004 | Lawrence | 705/37 |
| 2005/0022168 A1* | 1/2005 | Zhu et al. | 717/124 |
| 2006/0085312 A1* | 4/2006 | Griffin et al. | 705/35 |

* cited by examiner

*Primary Examiner*—Daniel Hess
(74) *Attorney, Agent, or Firm*—Snell & Wilmer L.L.P.

(57) ABSTRACT

A system for analyzing account information including a processor grouping a plurality of individuals into a plurality of certification groups and assigning a corresponding rule set to each individual based on the certification grouping. A system for analyzing account information for individuals including a processor dividing the individuals into groups, a database storing account information for each individual and a processor analyzing the stored account information for each individual. The analysis includes reviewing a subset of the account information for each individual, the subset of account information being determined by the individual's group. A system for storing account and rule set certification information including a processor providing account information and a rule set to each of a plurality of individuals and a database storing one or more data files, including one or more of a rule set file, an accounts owned data file and a transactions data file.

16 Claims, 2 Drawing Sheets

ACCOUNT MONITORING SYSTEM

CROSS-REFERENCE TO RELATED APPLICATIONS

The present application claims the benefit of U.S. Provisional Application Ser. No. 60/552,649 filed Mar. 12, 2004, the disclosure of which is entirely incorporated herein by reference.

TECHNICAL FIELD

The present subject matter relates to a system for monitoring activity in accounts. More specifically, the present subject matter relates to a system for monitoring activity in associated person securities accounts for compliance with a set of rules or regulations, such as the Securities and Exchange Commission regulations.

BACKGROUND

A variety of laws, regulations and industry standards apply to securities brokers/dealers and the companies employing brokers/dealers. As a result, companies employing brokers/dealers are compelled to monitor personal security trades of associated persons, which may include employees, contractors and vendors, as well as their spouses, partners and other financially dependent members of their household. Often, company's associated persons must adhere to additional personal trading rules.

SUMMARY

There is provided a system for monitoring accounts for compliance with a set of regulations, such as, for example, the Securities and Exchange Commission ("SEC") regulations. The system utilizes highly automated software to monitor a predetermined group of accounts for violations of company policy and industry regulations, such as, for example, insider trading.

The system includes a pre-clearance portion and an audit portion. The pre-clearance portion of the system reviews proposed transactions for compliance with applicable policy and regulations. The audit portion of the system reviews transaction that have been made for compliance with the applicable policy and regulations.

The system may utilize separate analysis parameters for different types of accounts. For example, there may be more stringent regulations imposed on account owners having greater access to confidential or other restricted access information.

One aspect is a system for analyzing account information for a plurality of people including a processor dividing the people into groups, a database storing account information for each person and a processor analyzing the stored account information for each person. Differing subsets of trading activity are analyzed for each person based upon the person's group. Another aspect includes a system for analyzing account information including a processor grouping people into certification levels and assigning a certification rule set to each person based on the certification level grouping. Another aspect includes a system for storing certification information including a processor providing electronic certification verification and a database storing the data files being verified by the people. The data files can be a code of ethics, information about the accounts owned, information about the holdings owned and/or information about the transactions in the accounts.

DETAILED DESCRIPTION

The account monitoring system is a highly automated system for monitoring associated person accounts for compliance with a defined set of regulations.

Figure 1:
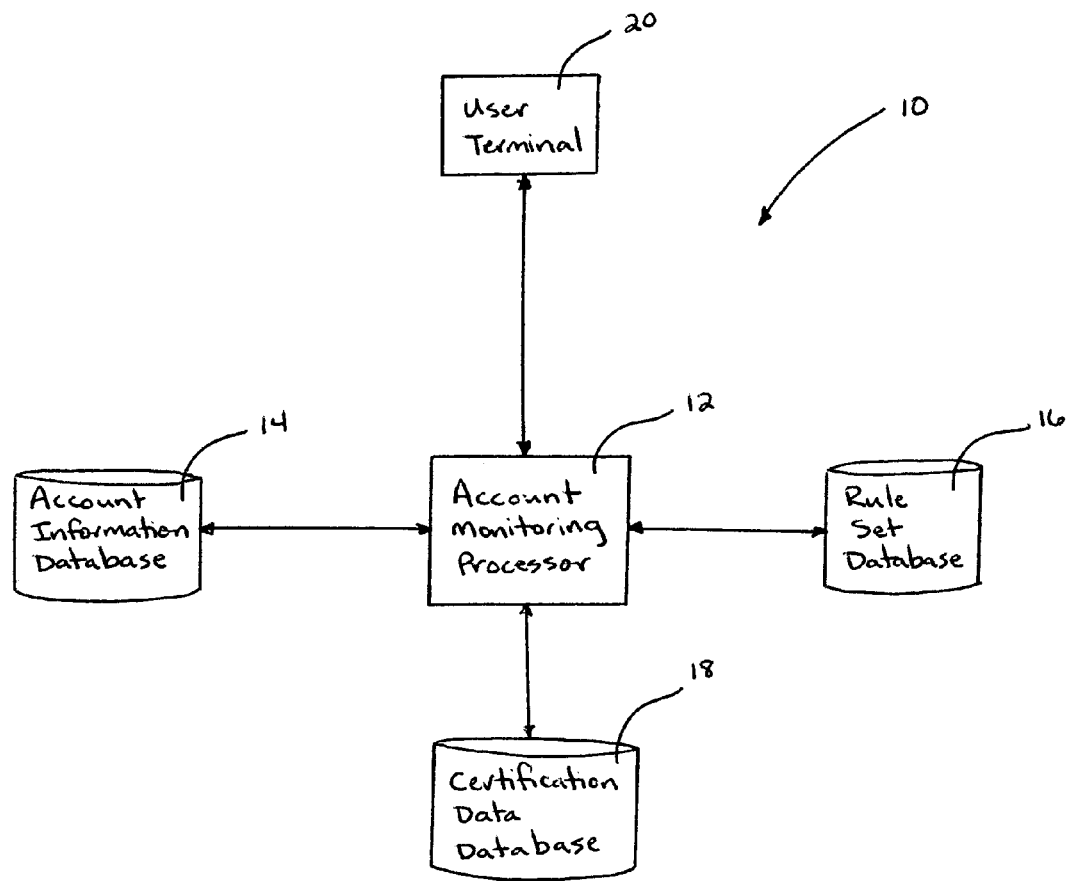
FIG. 1 is a schematic depicting a system for implementing the present subject matter.

FIG. 1 illustrates an embodiment of an account monitoring system 10. As shown in FIG. 1, the account monitoring system 10 includes an account monitoring processor 12, an account information database 14, a rule set database 16, a certification data database 18 and a user terminal 20. The user terminal 20 may be a computer connected to the account monitoring processor 12 through a network. For example, the user terminal 20 may be a personal computer networked to the account monitoring processor 12 through an intranet network. Alternatively, the user terminal 20 may be connected to the account monitoring processor 12 via an internet network, a direct communications connection or any other networking or communication connection. The user terminal 20 allows a user to both input information to, and receive information from, the account monitoring processor 12, as is further describe below.

The functions of account monitoring system 10, including the account monitoring processor 12, the account information database 14, the rule set database 16, the certification data database 18 and the user terminal 20, may be performed by a single computer or computer system. Alternatively, the various components used to accomplish the functions of the account monitoring process 10 may be resident in a plurality of computers or computer systems.

Figure 2:
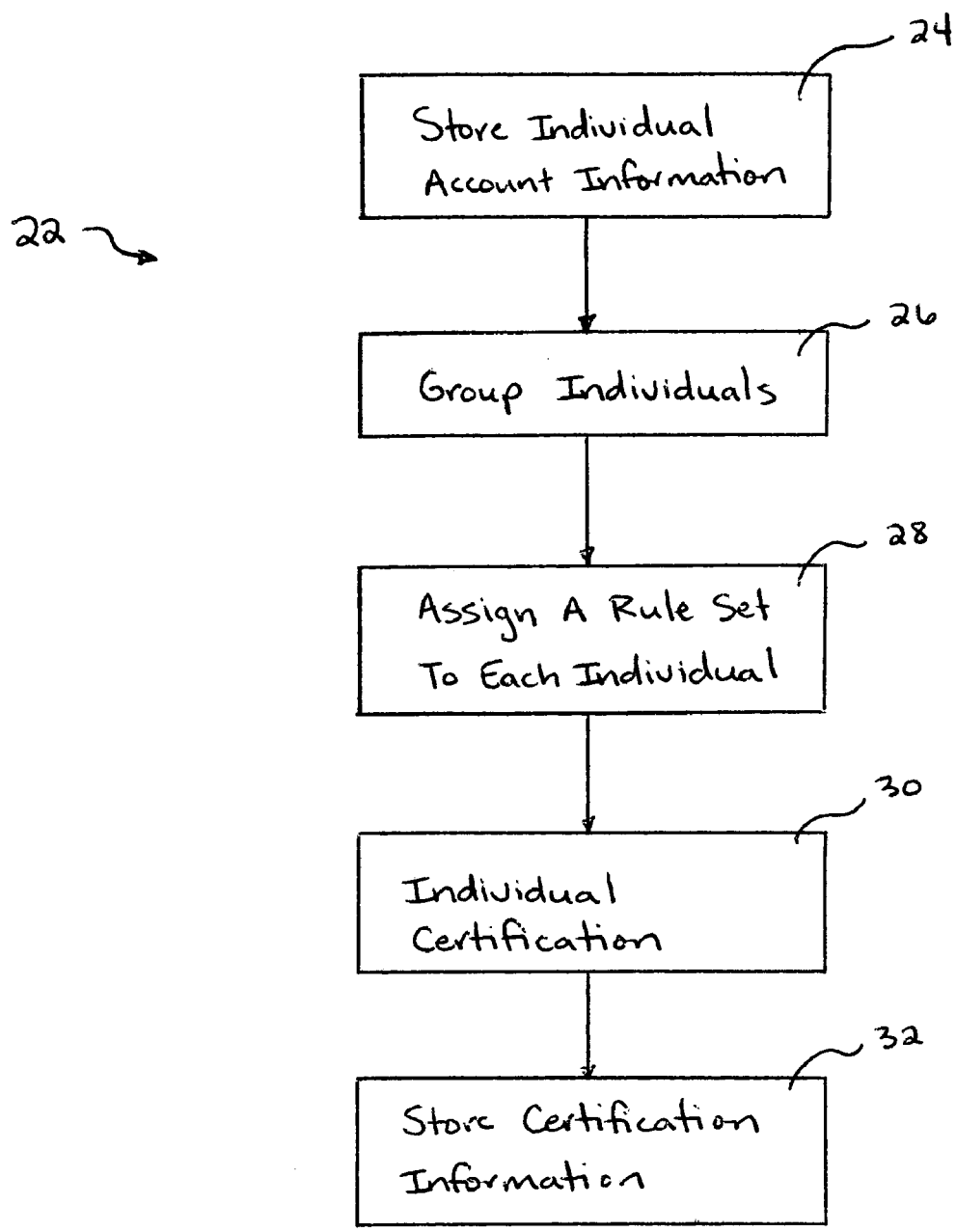
FIG. 2 is a flow chart depicting a method for implementing the present subject matter.

FIG. 2 illustrate an account monitoring method 22, which employs the account monitoring system 10 of FIG. 1, referred to collectively herein as the account monitoring system and method 10 and 22. The account monitoring system and method 10 and 22 may be utilized to monitor individuals associated with the securities brokerage field. For example, the account monitoring system and method 10 and 22 may be used to monitor the employees, independent contractors and other individuals associated with a corporation whose business pertains to securities. The various individuals associated with the corporation may each be subject to varying sets of company policy and industry regulations based upon their level of access to securities related information.

The account monitoring system and method 10 and 22 shown in FIGS. 1 and 2 generally monitors individuals' accounts for compliance with the Securities and Exchange Commission ("SEC") regulations. Of course, the account monitoring system and method 10 and 22 may be employed to provide other forms of account monitoring and may be applied to other industries and regulations as well.

As shown in FIG. 2, the account monitoring method 22 includes a step of storing individual account information 24. The individual account information is stored in the account information database 14 shown in FIG. 1 and may be input to the account monitoring system 10 through the user terminal 20. Through the step of storing individual account information 24, account information is stored for each individual to be monitored via the account monitoring system and method 10 and 22. Any type of information concerning any type of account may be stored. For example, in a contemplated embodiment of the account monitoring method 22, information concerning an individual's brokerage accounts, 401(k) accounts, profit sharing accounts, company stock accounts, dividend reinvestment accounts, merger equity, tender offers, private placement activity, limited partnerships, mutual funds and other securities accounts may be monitored for compliance with SEC regulations. It is understood that account information includes information about accounts, as well as other holdings. Therefore, as used herein, the term accounts includes both accounts and other holdings. Moreover, the information stored may include the transactions that have occurred in each of the accounts within a given time period. Thus, the data stored may include account data as well as transaction data.

Each individual who is subject to monitoring via the account monitoring system and method 10 and 22 may be required to provide information about each of the individual's accounts or, alternatively, the information collected regarding each individual's accounts may be determined by the various groupings to which the individual is assigned through the account monitoring method 22 as described further below.

As also shown in FIG. 2, the account monitoring method 22 also includes a step of grouping individuals 26. The step of grouping individuals 26 includes classifying each of the individuals into one or more groups to be used to determine the account information analyzed and the rule sets to apply to the account information for each individual. The number and type of groupings used depends upon the individuals to be monitored, the organization doing the monitoring and the rule sets to be applied.

For example, in an investment organization utilizing the account monitoring method 22, the step of grouping individuals 26 may include classifying the individuals according to access group, department group, location group and certification group. Individuals may be classified into an access group based on the individual's "access" to investment information. For example, individuals may categorized into one of three access groups, such as portfolio managers, investment persons and other individuals. The type of accounts analyzed in the account monitoring method 22 may be determined by the access group to which the individual belongs. For example, portfolio managers may need to certify to a greater number of account rules than other individuals.

Individuals may be further classified into a department group based on their job department. Individuals that do not belong to a particular department may be classified into the "field" department category or may be grouped according to their job title.

Individuals may also be classified according to their location group. For example, in multi-facility organizations, the individual's location group may be determined by the facility at which the individual works. The location grouping may be as specific as required by the organization and may classify the individuals according to areas within a facility to which the individuals have access.

Moreover, individuals may be classified into a plurality of certification groups based on the rule set to which the individual will be required to certify and the timing the certification will occur. Certification groups may be based on job title. Alternatively, access to information, such as insider trading information, may be used to determine the certification group. Moreover, different certification groups may be subject to the account monitoring method 22 at different times of the year. For example, the individuals may be classified into one of three certification groups, such as, access individuals, non-access corporate office individuals and non-access field individuals, wherein the access individuals are individuals with access to insider trading information who must certify by January each year, the non-access corporate office individuals are individuals that do not have access to insider trading information who must certify by March of each year and non-access field individuals are individuals that do not have access to insider trading information who must certify by August of each year. In such an example, the rule set that applies to each of the non-access corporate office individuals and the non-access field individuals may be identical. Similarly, other certification groups may be utilized wherein differing rules sets are applied at the same time. Of course, any certification groups or any number of certification groups may be implemented.

Utilizing certification groups enables the account monitoring method 22 to be utilized in large organizations while keeping the number of individuals subject to the certification process at any given time to a manageable number.

As also shown in FIG. 2, the account monitoring method 22 further includes a step of assigning a rule set to each individual 28. The step of assigning a rule set to each individual 28 may include assigning rule sets to each individual based upon the groups to which the individual is assigned. For example, the certification group to which the individual is assigned may determine the rule set that is to be applied to the individual.

As further shown in FIG. 2, the account monitoring method 22 includes a individual certification step 30. Through the individual certification step 30, each individual subject to the account monitoring method 22 certifies to the individual's accounts and to the rule set that applies to the individual. Various rule sets may be stored in the rule set database 16, shown in FIG. 1. For example, the rule set database may store rule sets for each certification group for each certification period, such as, a rule set for each certification group for each calendar or annual year.

Through the individual certification step 30 an individual is provided a listing of the information pertaining to the individual that is stored in the account information database 14, as well as the rule set that applies to the individual. The individual then reviews the account information and the applicable rule set before certifying the individual has complied with the requirements of the rule set. The individual certification step 30 may be accomplished through the user terminal 20.

The account information and the rule set certified to by the individual though the individual certification step 30 may be stored in the certification data database 18 via a store certification information step 32. Therefore, through the store certification information step 32 a "snapshot" of the information certified by each individual may be stored for future reference. Thus, at any time after an individual has completed the individual certification step 30, the information certified to may be recalled. For example, it may be advantageous to have access to the accounts and rule set that had been certified to in a prior year for review. The snapshots stored in the certification data database 18 through the store certification information step 32 may be retained for a predetermined time period, which may correspond to applicable regulations.

The accounting monitoring method 22 may be applied to an individual's accounts as part of either a pre-clearance function to provide advance authorization for any transaction covered by the account monitoring system and method 10 and 22 or as part of an auditing function to ensure the activity performed in fact meets the applicable regulations. The application of the account monitoring method 22 in its pre-clearance or the audit capacity may be dictated by the grouping to which the individual is assigned. For example, the audit function may be run more frequently for individuals for which activity is more likely to involve complex transactions or transactions requiring greater sensitivity to the regulations. For example, the audit function may be performed quarterly for accounts of individuals that have access to insider information and annually for other individuals.

Those of ordinary skill in the art will readily recognize that the functions and capabilities of the securities account monitoring system can be implemented on one or more machines or computers in a network, which may use one or more computer platforms. A general purpose computer may be used to execute computer or machine readable instructions and carryout or perform desired steps or functions. As is known to those of ordinary skill in the art, a general-purpose computer typically comprises a central processor, an internal communication bus, various types of memory (RAM, ROM, EEPROM, cache memory, etc.), disk drives or other code and data storage systems, and one or more network interface cards or ports, and sound cards for communication purposes. The computer and computer system may also use a relatively high-speed communication interface to an external network.

Moreover, software functionalities involve programming, including executable code as well as associated stored data. The software code is executable by the general-purpose computers or processors that can functions as part of the securities account monitoring system. In operation, the executable program code or software and associated data can be stored in an appropriate memory or data storage locations and/or transported for loading into appropriate general-purpose computing machines. In one aspect, the present subject matter involves one or more software products and applications in the form of one or more modules of code carried by at least one machine-readable medium. Execution of such code by one or more processors of the computer platform enables implementation and operation of the securities account monitoring system.

As used herein, terms such as computer or machine "readable medium" refer to any medium that participates in providing instructions to a processor for execution. Such a medium may take many forms, including but not limited to, non-volatile media, volatile media, and transmission media. Non-volatile media include, for example, optical or magnetic disks, such as any of the storage devices in a computer or machine. Volatile media include dynamic memory, such as main memory of such a computer. Physical transmission media include coaxial cables, copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media include, for example: a floppy disk, a flexible disk, hard disk, magnetic tape, any other magnetic medium, a CD-ROM, DVD, any other optical medium, punch cards, paper tape, any other physical medium with hole patterns, a RAM, a PROM, and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the technology and subject matter disclosed herein may be implemented in various forms and examples, and that they may be applied in numerous applications, only some of which have been described herein. Those skilled in that art will recognize that the disclosed aspects may be altered or amended without departing from the true spirit and scope of the subject matter. Therefore, the subject matter is not limited to the specific details, representative devices, and illustrated examples in this description. It is intended to protect any and all modifications and variations that fall within the true scope of the advantageous concepts disclosed herein.

We claim:

1. A system for analyzing account information having a processor configured to:

assign an individual to an access group based on an assessment of a level of access to investment information among each of said plurality of individuals;

assign said individual to a department group based on departmental access to said investment information by said individual;

assign said individual to a location group based on a proximity of a working location to said trading information by said individual;

assign said individual to a certification group based on said access group, said department group and said location group, wherein said certification group has certification rules defining account information that said individual is to provide;

facilitate said certification process, wherein said certification process collects account information from said individual in accordance with said certification rules;

provide an advance authorization for future account transactions prior to receiving a trading order, wherein said advance authorization is determined according to said account information and said certification group associated with said individual; and, perform an audit to determine whether previous account transactions are in accordance with said certification group of each said individual grouping, wherein said audit is triggered prior to receiving a trading order.

2. The system of claim 1, wherein said individual is affiliated with an organization.

3. The system of claim 1 wherein said certification group includes separate groups of individuals having access to insider information and individuals that do not have access to insider information.

4. The system of claim 1 wherein said certification group includes separate groupings of individuals whose account information is to be analyzed at separate times.

5. The system of claim 1 wherein said certification rules includes security exchange commission regulations and company policy.

6. The system of claim 1, wherein said advance authorization is not triggered by an account transaction.

7. A system for analyzing account information for a plurality of individuals having a processor configured to:

assign an individual to an access group based on an assessment of a level of access to investment information by said individual;

assign said individual to a department group based on departmental access to said investment information by said individual;

assign said individual to a location group based on a proximity of a working location to said trading information by said individuals;

assign said individual to a certification group based on said access group, said department group and said location group, wherein said certification group has certification rules defining account information that said individual is to provide;

facilitate said certification process, wherein said certification process collects account information from said individual in accordance with said certification rules;

store said account information for said individual;

analyze said stored account information for said individual, including reviewing a subset of said account information for said individual, said subset of account information being determined by said certification group of said individual;

provide an advance authorization for future account transactions prior to receiving a trading order, wherein said advance authorization is determined according to said certification group of said individual; and, perform an audit to determine whether previous account transactions are in accordance with said certification group of said individual, prior to receiving a trading order.

8. The system of claim 7 wherein said account information stored for said individual is based on said certification group associated with said individual.

9. The system of claim 7 wherein said account information includes account holdings and account transaction information.

10. The system of claim 7, wherein said advance authorization is not triggered by an account transaction.

11. A system for storing account and rule set certification information having a processor configured to:

assign an individual to an access group based on an assessment of a level of access to investment information among each of said plurality of individuals;

assign said individual to a department group based on departmental access to said investment information by said individual;

assign said individual to a location group based on a proximity of a working location to said trading information by said individual;

assign said individual to certification group based on said access group, said department group, and said location group;

provide account information and a rule set to said individual, wherein said rule set is based on said certification group;

store data files, said data files having been provided to said individual by said processor, wherein said data files are selected according to at least one of: a rule set file, an accounts owned data file and a transactions data file;

provide an advance authorization for future account transactions prior to receiving a trading order, wherein said advance authorization is determined according to said data files; and, perform an audit to determine whether previous account transactions are in accordance with said data files, prior to receiving a trading order.

12. The system of claim 11 wherein a plurality of individuals are grouped according to certification groups.

13. The system of claim 12 wherein said individual is a given certification group is provided with a given rule set.

14. The system of claim 11 wherein said rule set includes security exchange commission regulations and company policy.

15. The system of claim 11 wherein a plurality of individuals are grouped according to access groups.

16. The system of claim 11, wherein said advance authorization is not triggered by an account transaction.

* * * * *